(12) United States Patent
Parkinson

(10) Patent No.: US 7,997,419 B2
(45) Date of Patent: Aug. 16, 2011

(54) FLUIDIZING APPARATUS

(75) Inventor: David J. Parkinson, Clevedon (GB)

(73) Assignee: DPS Bristol (Holdings) Ltd, Bristol (GB)

( * ) Notice: Subject to any disclaimer, the term of this patent is extended or adjusted under 35 U.S.C. 154(b) by 669 days.

(21) Appl. No.: 11/997,533

(22) PCT Filed: Aug. 2, 2006

(86) PCT No.: PCT/GB2006/002879
§ 371 (c)(1),
(2), (4) Date: Jan. 31, 2008

(87) PCT Pub. No.: WO2007/015091
PCT Pub. Date: Feb. 8, 2007

(65) Prior Publication Data
US 2008/0219779 A1    Sep. 11, 2008

(30) Foreign Application Priority Data

Aug. 2, 2005   (GB) .................................. 0515939.7

(51) Int. Cl.
*B03B 5/30*   (2006.01)
*B65G 53/40*   (2006.01)
(52) U.S. Cl. ......... 209/725; 209/496; 406/137; 239/590
(58) Field of Classification Search .................. 209/490, 209/491, 495, 496, 499, 500, 156, 157, 725; 239/590, 591; 406/137, 142
See application file for complete search history.

(56) References Cited

U.S. PATENT DOCUMENTS

| | | | | |
|---|---|---|---|---|
| 353,775 A * | 12/1886 | Booraem | ....................... | 209/210 |
| 762,867 A * | 6/1904 | Allen | ............................ | 209/158 |
| 1,312,266 A * | 8/1919 | Navin | ........................... | 208/390 |
| 2,150,226 A * | 3/1939 | Kennedy | ....................... | 209/160 |
| 2,354,856 A * | 8/1944 | Erwin | ........................... | 208/187 |
| 3,642,129 A * | 2/1972 | McDaniel et al. | ............. | 209/159 |
| 4,497,598 A | 2/1985 | Blanton | | |
| 4,562,612 A | 1/1986 | Williams et al. | | |
| 4,952,099 A | 8/1990 | Drobadenko et al. | | |
| 4,978,251 A | 12/1990 | Drobadenko et al. | | |
| 4,992,006 A | 2/1991 | Drobadenko et al. | | |
| 5,516,046 A * | 5/1996 | Cline et al. | .................... | 239/427 |
| 5,707,513 A | 1/1998 | Jowett et al. | | |
| 5,853,266 A | 12/1998 | Parkinson et al. | | |
| 6,662,953 B1 * | 12/2003 | Rouse | ........................... | 209/682 |
| 2008/0110803 A1 * | 5/2008 | Veltri et al. | .................... | 208/390 |

FOREIGN PATENT DOCUMENTS

| | | |
|---|---|---|
| DE | 4142916 | 7/1993 |
| GB | 1026826 | 4/1966 |
| GB | 1220220 | 1/1971 |
| NL | 1020751 | 12/2003 |
| WO | WO-03/101868 | 12/2003 |

* cited by examiner

*Primary Examiner* — Joseph C Rodriguez
(74) *Attorney, Agent, or Firm* — Honigman Miller Schwartz and Cohn LLP

(57) ABSTRACT

A fluidizing apparatus comprises a vessel having an inlet, a plurality of outlets and a nozzle, through which a pressurized fluid can be fed into the vessel. The outlets are spaced at different heights from a base of the vessel and are controlled by valves enabling fluidized solids to be removed in layers from the vessel. In a further embodiment, a single outlet is raised or lowered to a desired position in the vessel.

13 Claims, 6 Drawing Sheets

FLUIDIZING APPARATUS

TECHNICAL FIELD

The present invention relates to fluidizing apparatus and particularly, although not exclusively, to a fluidizing apparatus for transporting solids from a vessel to a discharge pipeline or other system.

BACKGROUND OF THE INVENTION

The current state of art with regard to slurry hydro-transportation and vortex nozzles used to generate a fluidizing effect within a vessel or tank is described in U.S. Pat. Nos. 4,978,251, 4,952,099 4,992,006, 5,853,266 and in International patent application PCT/GB 03/02370. All of these documents disclose an inlet section that creates a swirling flow and an outlet section positioned either within the inlet section or in close proximity to the same for the discharge of the material to the outlet of the container.

A particular disadvantage of the fluidizing units described in the above mentioned documents, is that the discharge duct has to be within the nozzle or at a close proximity to the nozzle. In practice, it has been discovered that a discharge duct is subjected to considerably more erosion than an inlet duct because the slurry discharge is more abrasive than the driving fluid of the fluidizing apparatus. Therefore, it would be advantageous to be able to operate a system in which the discharge duct is positioned some distance from the fluidizing nozzle and which reduces the wear on the discharge duct.

SUMMARY OF INVENTION

According to the first aspect of the present invention there is provided a fluidizing apparatus comprising a vessel having an inlet, a plurality of outlets, and a nozzle through which a pressurized fluid can be fed into the vessel, the outlets each being spaced at a different height from a base of the vessel.

It is an advantage of the invention that the outlets can be utilized to remove solids of different densities and/or particle sizes that may have stratified within the containment vessel.

Preferably each outlet is controlled by a valve, which enables each outlet to be selectively opened or closed.

Preferably a replaceable wear insert is provided in each outlet.

Preferably an internal end of each insert is either substantially flush with an internal wall of the vessel or offset externally of the internal wall.

Preferably in the case of very large vessels or tanks, the outlets are a series of dip tubes of varying length, which enter the vessel from the top of the vessel.

Preferably each insert is made from a ceramic, metal, metal alloy, plastic or composite material.

It is an advantage of the invention that the or each insert can be removed and replaced when worn, thus preventing or substantially reducing wear to the or each outlet duct. Furthermore, because neither the insert nor the outlet duct protrude inside the vessel, the outlet does not interfere with flow regimes inside the vessel.

The nozzle may be adapted to create swirling flow of a fluid passing through the nozzle.

Alternatively the nozzle may be a jetting nozzle.

A deflector may be mounted in front of the nozzle, which is adapted to deflect and direct the flow path of a fluid passing through the nozzle.

Preferably one or more ultrasonic transducers or pulse inducers are incorporated in the deflector.

Preferably the inlet is in communication with a hopper from which media can be fed to the vessel.

Preferably a pressure relief line including a pressure relief valve extends from the vessel to the hopper.

Preferably the vessel has a vertical axis, the inlet is positioned at an upper end of the vessel, the plurality of outlets are longitudinally spaced vertically along the vessel, and the nozzle is positioned proximate the base of the vessel.

According to the second aspect of the present invention there is provided a fluidizing apparatus comprising a vessel having an inlet, at least one outlet, and a nozzle through which a pressurized fluid can be fed into the vessel, the at least one outlet being movable substantially vertically relative to the bottom of the vessel.

Preferably the vertical position of the outlet in the vessel is raised and lowered by means of a mechanical arrangement, the outlet being sealed to the vessel.

The mechanical arrangement may be a rack and pinion.

Preferably a replaceable wear insert is provided in the outlet.

Preferably the insert is made from a ceramic, metal, metal alloy, plastic or composite material.

Preferably the nozzle is adapted to create swirling flow of a fluid passing through the nozzle.

Preferably the nozzle is a jetting nozzle and a deflector is mounted in front of the nozzle, which is adapted to direct the flow path of a fluid passing through the nozzle.

Preferably one or more ultrasonic transducers are incorporated in the deflector.

Preferably the inlet is in communication with a hopper from which media can be fed to the vessel.

Preferably a pressure relief line including a pressure relief valve extends from the vessel to the hopper.

According to a further aspect of the invention there is provided a method of fluidizing and partially separating media from a settled bed of solids contained in a vessel of a fluidizing apparatus according to the first aspect of the invention, in which pressurized fluid, for example, water, is injected into the vessel through the nozzle causing the settled solids within the vessel to be fluidized, and selectively allowing flow from the vessel through one or more of the outlets.

The outlets may be sequentially selected beginning with the uppermost outlet and ending with the lowermost outlet or vice versa.

According to a further aspect of the invention there is provided a method of fluidizing and partially separating media from a settled bed of solids contained in a vessel of a fluidizing apparatus according to the second aspect of the invention, in which a pressurized fluid is injected into the vessel through the nozzle causing the settled solids within the vessel to be fluidized, and allowing flow from the vessel through the outlet, the position of the outlet being moved relative to the base of the vessel in order to remove solids from the vessel of a desired particle size.

According to a further aspect of the present invention there is provided a use of a fluidizing apparatus in separation of solids of varying particle size by injecting a pressurized fluid through a fluidizing nozzle into a vessel containing a settled bed of the solids, and removing fluidized solids of a predetermined particle size from the vessel through an outlet positioned at a height relative to the base of the vessel determined by the position in the vessel of the solids being removed.

According to a further aspect of the present invention there is provided a use of a fluidizing apparatus in removing filter media, for washing, from the upper end of a media down-flow filter by injecting a pressurized fluid through a fluidizing nozzle into the filter and removing contaminated filter media from a desired position in the filter through an outlet positioned at a height relative to the base of the vessel determined by the position of the contaminated filter media to be removed.

According to a yet further aspect of the present invention there is provided a use of a fluidizing apparatus in removing filter media, for washing, from the upper end of an online media down-flow filter by injecting a pressurized fluid through a fluidizing nozzle into the filter and removing contaminated filter media from a desired position in the filter through an outlet positioned at a height relative to the base of the vessel determined by the position of the contaminated filter media to be removed.

It is an advantage of the invention that the flow from the nozzle generates a mixture of solids and liquid within the vessel, which is transported from the vessel at a controlled concentration, pressure and velocity. The particle size of media removed from the vessel is determined by the position of the outlet, but can also be controlled to some extent by the velocity of the pressurized feed water to the fluidizer nozzle.

A further benefit of the invention is that material can be removed from the upper portion of a settled bed of solids contained in a containment vessel without removing the lower portion of the bed. This is useful, for example, in the case of a dual media filter for the treatment of contaminated water. The lighter and sometimes larger media in the upper section of the filter, typically anthracite or activated carbon, which has the greatest solids holding capacity can be removed independent of its support media, typically sand or garnet, to a position outside the vessel for cleansing. Thereafter the media can be returned to the filter vessel. This operation substantially reduces the amount of water required to wash a filter of this type. Furthermore, the contaminated media can be removed, washed and replaced without the need for the filter to be taken offline. In other words, the filter can continue operating, whilst being cleaned.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF PREFERRED EMBODIMENTS

Figure 1:
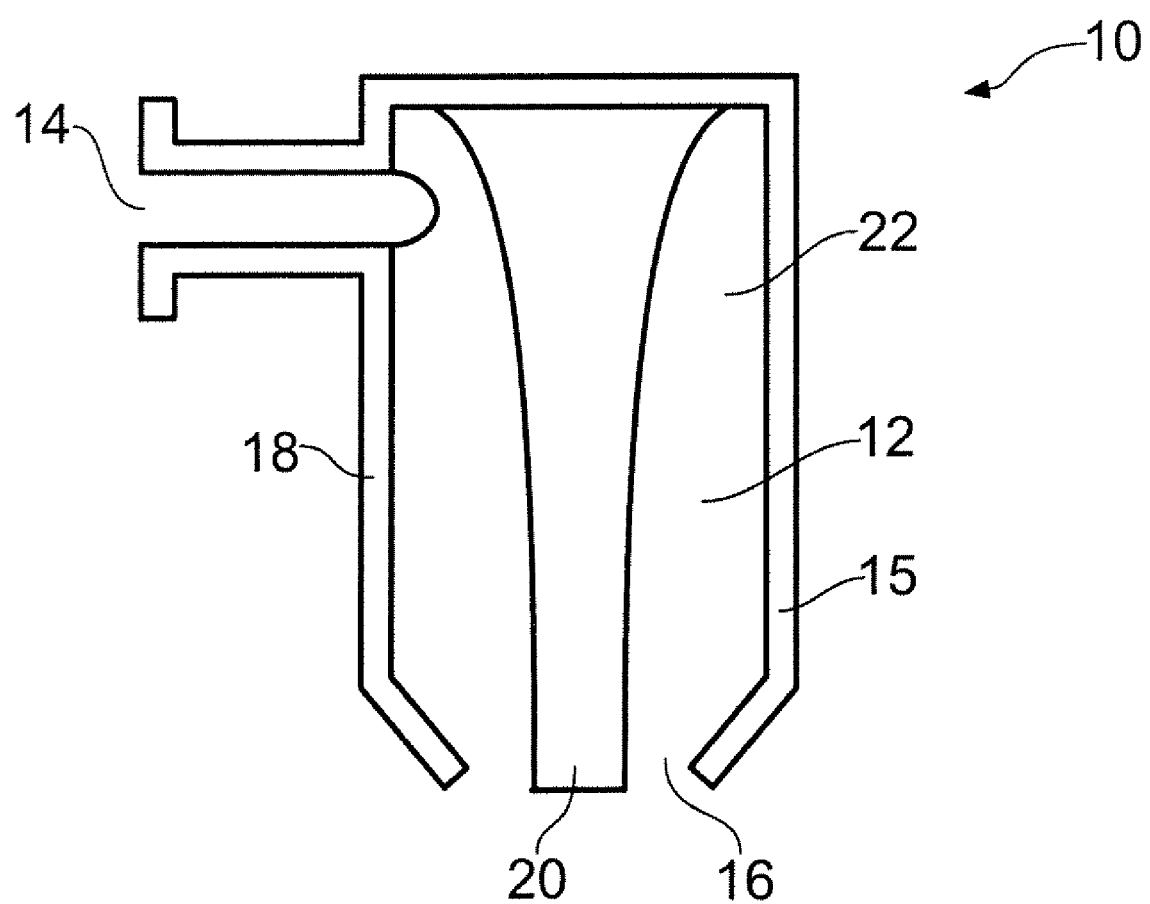
FIG. 1 is a cross-section through a fluidizing nozzle of the invention.

Referring firstly to FIG. 1, a fluidizing nozzle is indicated generally at 10, and comprises of a flow chamber 12 having a fluid inlet 14 and a fluid outlet 16. The flow chamber 12 is disposed in a substantially tubular housing 15 and is substantially defined by a side wall 18 of the housing and a solid circular central portion or stem 20, which lies on a central axis of the tubular housing 15. The cross section of the flow chamber 12 is therefore shaped as an annulus 22. The flow chamber outlet 16 is of reduced cross-sectional area, caused by inward necking of the side wall 18. This reduces the exit flow area, which, in use, has the effect of generating back pressure in the nozzle.

Figure 2:
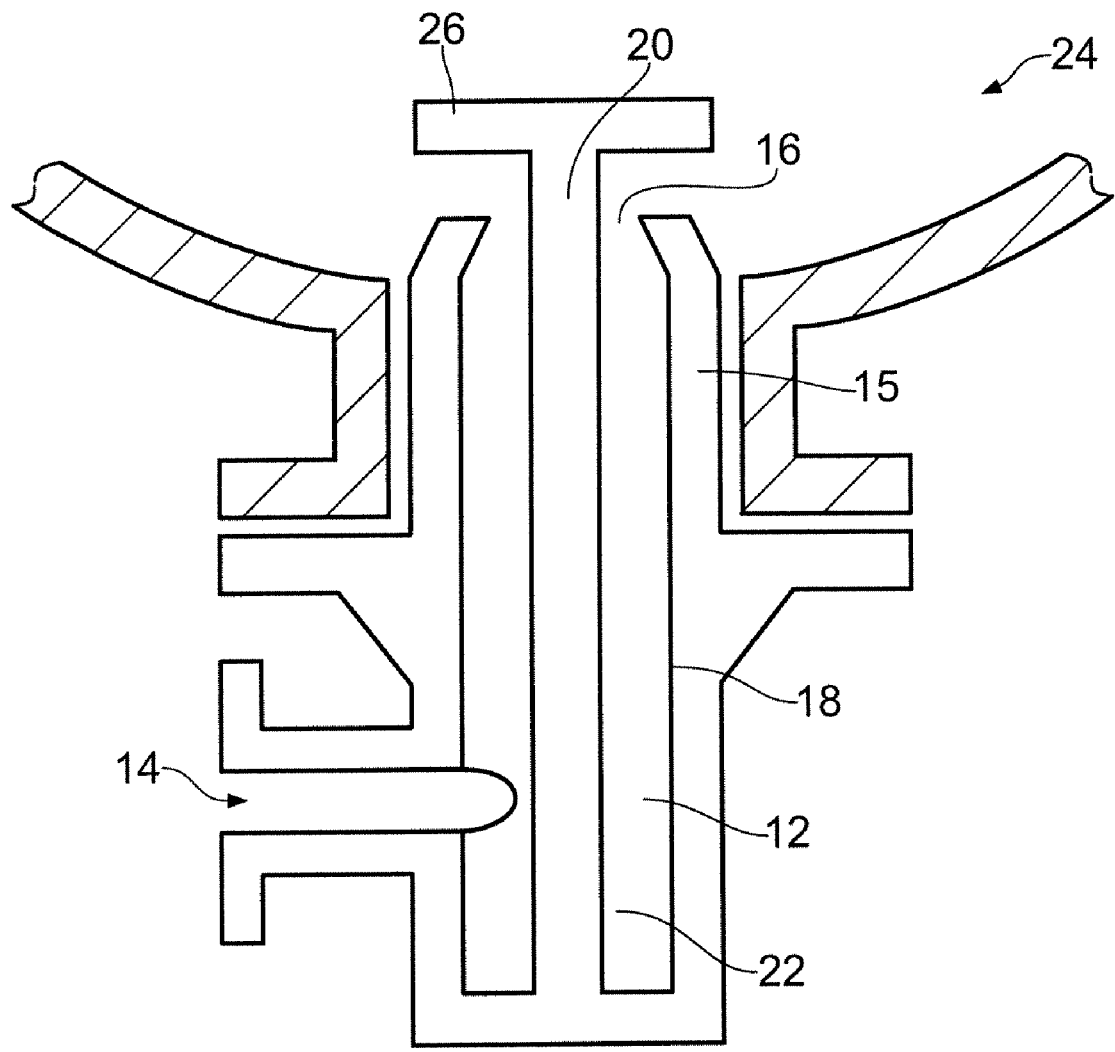
FIG. 2 is a cross-section through an alternative fluidizing nozzle of the invention, which may be inserted through an inlet at the base of a containment vessel.

Referring also to FIG. 2, an alternative fluidizing nozzle is indicated at 24 and common reference numerals have been used to designate parts in common with the nozzle 10 of FIG. 1. Nozzle 24 also includes a flow chamber 12 having a fluid inlet 14 and a fluid outlet 16. However, the central portion 20 extends beyond the mouth of the fluid outlet 16 and terminates in a substantially flat disc 26, of similar diameter to that of the outside of the housing 15. The disc 26 inhibits the ingress of solids to the flow chamber 12, when the nozzle is immersed in solids in the vessel.

Figure 3:
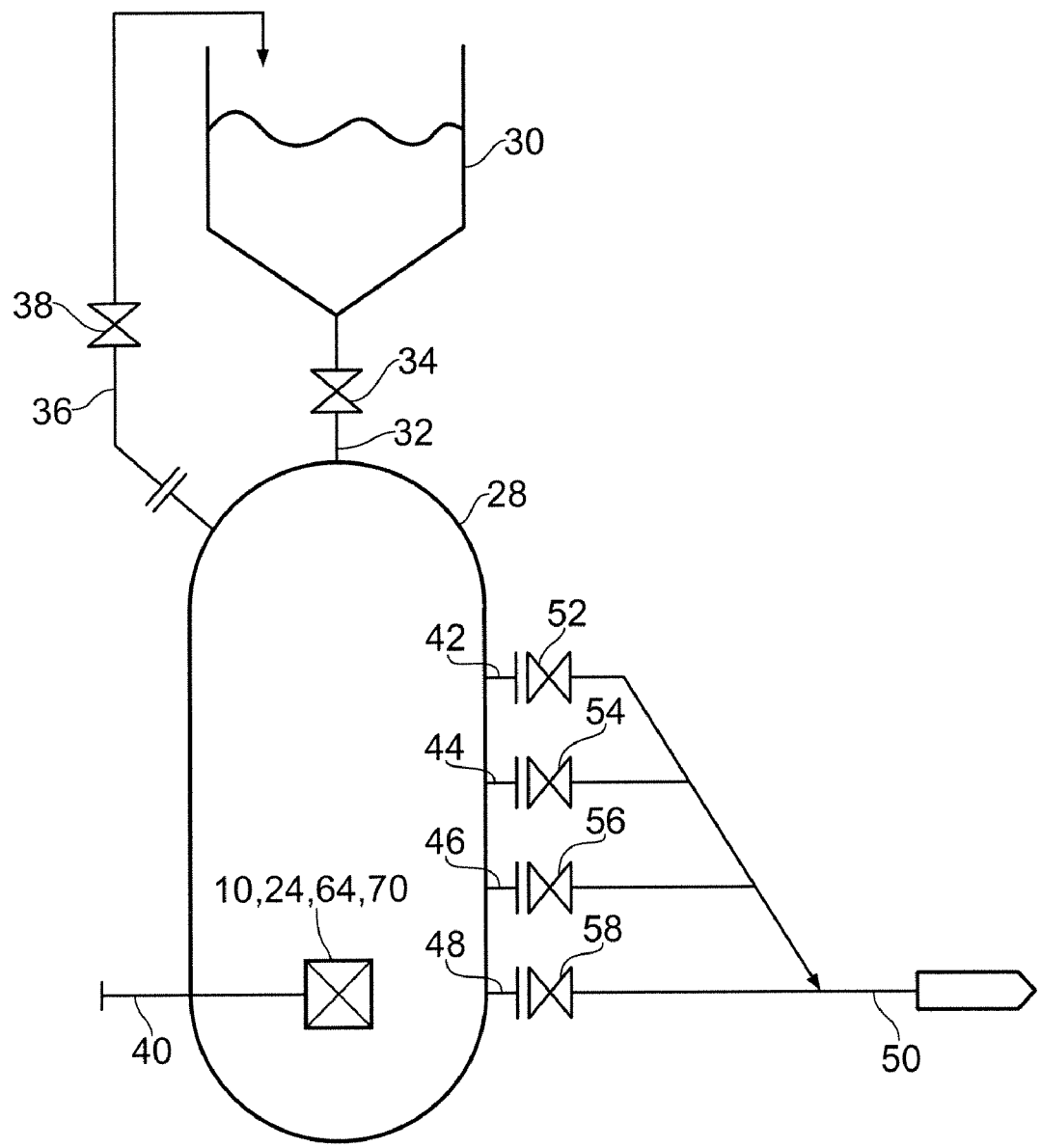
FIG. 3 is a schematic representation of a containment vessel showing a fluidizing nozzle and selectable slurry outlets.

In the use of both nozzles 10,24, fluid is fed under pressure in to inlet 14, which can be tangentially orientated or may have other means such as an auger situated within the flow chamber 12 in order to create a swirling flow, and hence a vortex. The swirling flow exiting the fluidizing nozzle 10,24 at outlet 16 is capable of imparting the required motion for fluidizing settled solids inside a tank or vessel 28, as shown in FIG. 3.

Figure 6:
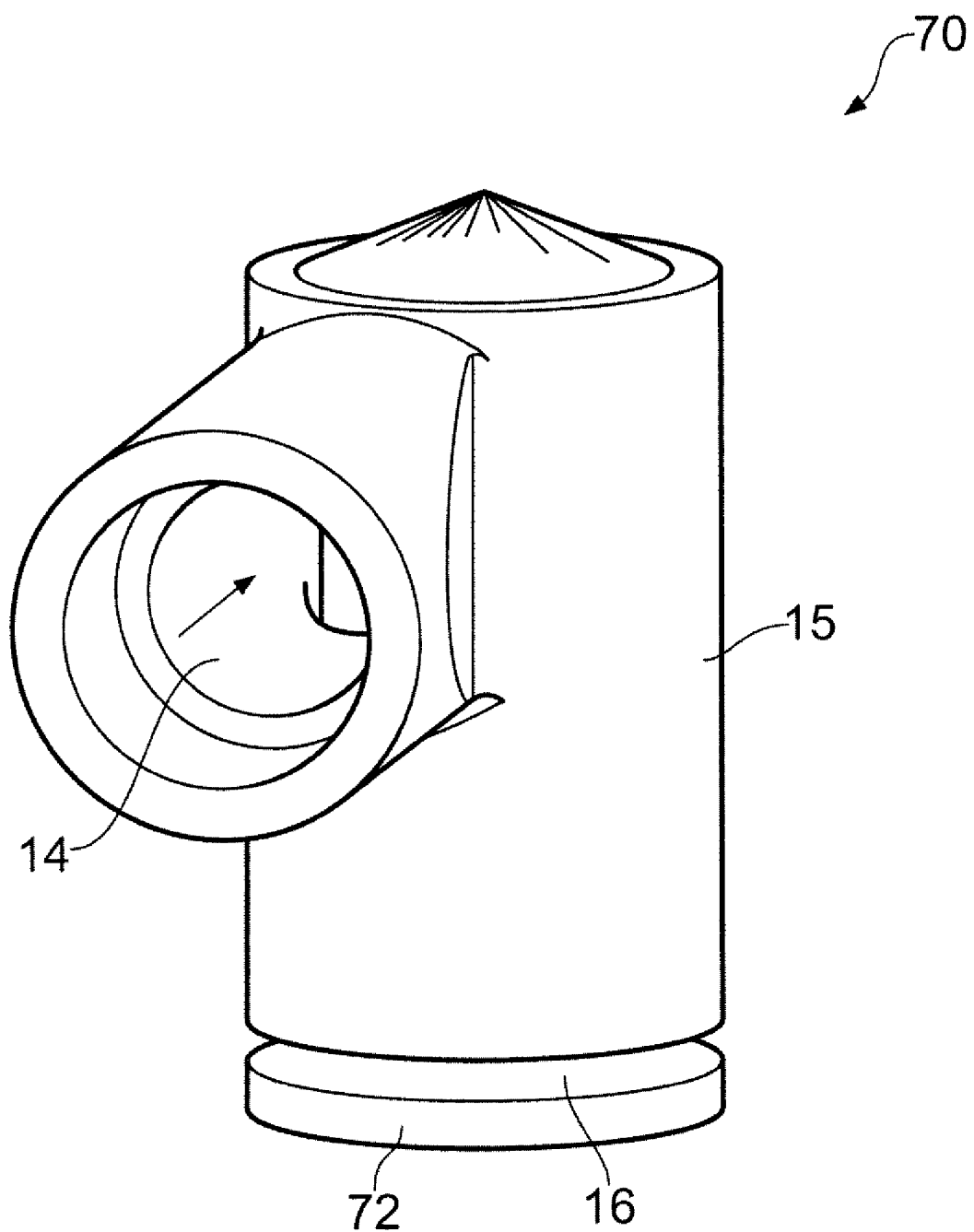
FIG. 6 is a schematic perspective view of a further fluidizing nozzle, similar in design to that shown in FIG. 2.

An alternative nozzle 70 is also shown in FIG. 6. Again, common reference numerals have been used to designate parts in common with the nozzle 10 of FIG. 1. The nozzle 70 has a tangential inlet 14, an outlet 16 and a tubular housing 15. However, as with the nozzle 24 shown in FIG. 2, the nozzle 70 includes a disc 72, which inhibits the ingress of solids to the flow chamber. The disc 72 is supported by a central portion or stem (not shown) similar to that of nozzle 24.

The vessel 28 is a pressure vessel and is fed from a solids hopper 30 through an input line 32. A valve 34 in the line 32 controls the flow of solids into the pressure vessel 28. A pressure relief line 36 incorporating a pressure relief valve 38 extends from the pressure vessel 28 back to the hopper 30. The pressure relief line 36 allows any fluids present in vessel 28 to be displaced or vented back to hopper 30, during filling of the vessel with solids from the hopper.

An inlet 40 is provided at the base of the vessel 28, which is connected to one of the fluidizing nozzle arrangements shown in FIGS. 1, 2 and 6. A plurality of outlets, four of which are shown, 42,44,46,48 are provided spaced out vertically along the side of the pressure vessel 28. There may be further outlets, as desired. Each outlet 42,44,46,48 reports to a single outlet line 50, a slurry pipe line, and each outlet is controlled by a separate valve 52,54,56,58.

Figure 4:
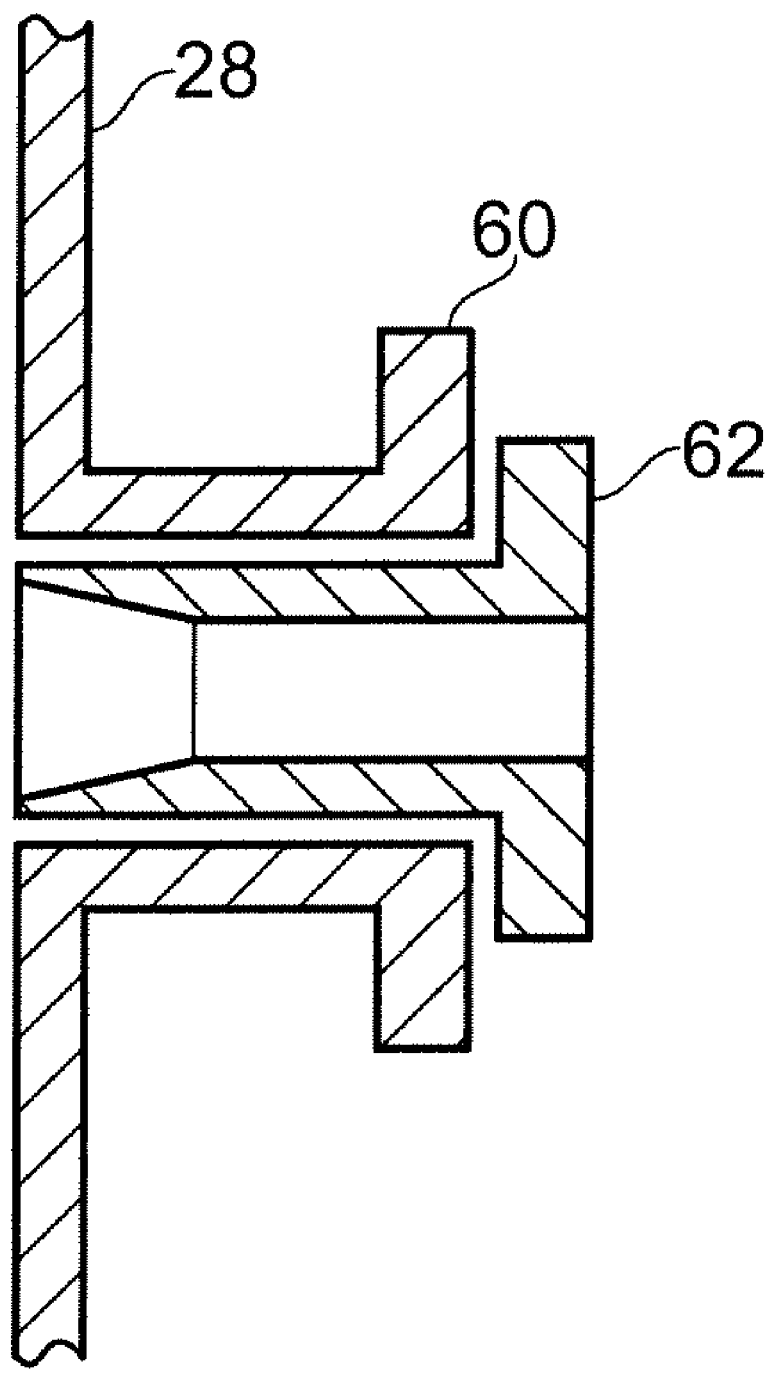
FIG. 4 is a schematic representation of a sacrificial wear insert, which may be situated within each of the slurry outlets to inhibit erosion/wear of the vessel outlet ducts or nozzles.

Referring also to FIG. 4, a slurry outlet nozzle 60 is shown with a removable sacrificial insert 62 disposed inside the wall of the nozzle. The slurry outlets 42,44,46,48 of the pressure vessel each comprise a nozzle 60. An internal end of each insert is either substantially flush with an internal wall of the vessel 28, as shown, or offset externally of the internal wall. Each removable insert is made from a ceramic, metal, metal alloy, plastic or composite material. The insert 62 protects each nozzle 60 of the pressure vessel 28 from excessive wear and also ensures that the internal diameter of the nozzle, ie that of the insert, is equal to the diameter of the bore of the valves 52,54,56,58 and the internal diameter of the slurry discharge pipe line 50. The fitting of the inserts 62 enables retrofitting of existing nozzles and/or conversion of existing filters and process equipment. The outlet shown is constructed in such a way that the wear insert 62 is incorporated into each discharge nozzle 60 of the vessel 28 so the discharge duct does not need to protrude inside the vessel and does not interfere with flow regimes inside the vessel 28.

Figure 5:
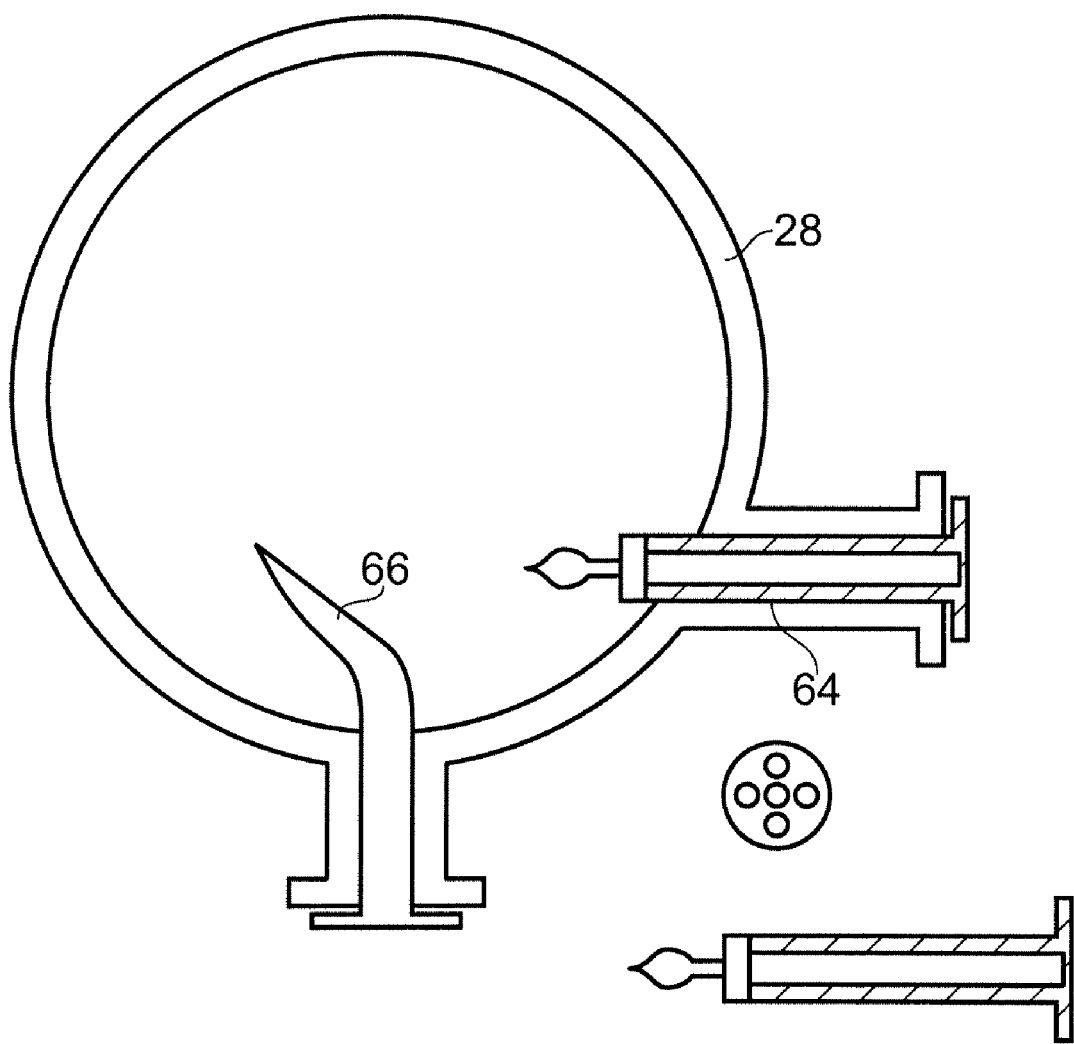
FIG. 5 shows a cross-section through a nozzle and a deflector plate arrangement of the invention.

An alternative fluidizing nozzle arrangement is shown in FIG. 5. In this arrangement a straightforward jetting nozzle 64 impinges on a sacrificial plate 66, which is positioned in the base of the vessel 28. One or more ultrasonic transducers can be incorporated into the impingement plate 66 to break up compacted material prior to transportation from the vessel. The sacrificial plate 66 both protects the vessel wall and imparts some rotational momentum to the flow. This arrangement, is operated more effectively at a higher pressures than the nozzle arrangements shown in FIGS. 1 and 2, In use, once solids material in the vessel 28 has settled, a fluid is fed under pressure to the fluidizing nozzle 10,24,64,70 through the inlet line 40. The fluid is typically water, and may include a surfactant. The valve 52 in the upper outlet 42 is open, and allows a flow of slurry to report out of the vessel to the outlet line 50. The other valves 54, 56, 58 are closed. Once the solids level inside the pressure vessel 28 has moved below the vertical level of the outlet 42, no further solids are transported from the vessel. At this time slurry outlet valve 52 can be closed and slurry outlet valve 54 opened, allowing slurry to leave the vessel until the solids are level with the position of the outlet nozzle 44. As before, the valve 54 can then be closed and the valve 56 opened, as desired. This procedure can be repeated for the slurry outlet 48, and for any further outlets provided. By this method, it is possible to remove stratified layers of solids of dissimilar density or specific gravity, which may have settled into layers in the pressure vessel under the influences of Stokes Law, from the vessel.

In an alternative arrangement, not shown, the outlets 42,44, 46,48 are replaced by a single outlet, which is positioned in the upper end of the vessel. The outlet is sealed to the vessel, but can be raised or lowered in the vessel to a desired position. This position is dependent on the particle size of settled, and subsequently fluidized solids, to be removed from the vessel. The velocity of pressurized flow entering the fluidizing nozzle 10,24,64,70 also affects the vertical height in the vessel at which the solids are removed through the outlet. The outlet is raised and lowered mechanically, typically by a rack and pinion arrangement, but any other suitable arrangement may be utilized.

It has also been found that the position and orientation of the fluidizing nozzle 10,24,70 within the vessel is not critical, and need not be positioned in a fixed spaced relationship from the outlet. This is important, because the fluidizing nozzle can remain in a fixed position, even though the outlet position can be changed.

The apparatus described is particularly suitable for use in a water filtration system and particularly in a system for cleansing a mixture of oil and water where a simple backflush for the whole bed is not be sufficient to recover the pressure drop from the bed and hence maintain its throughput. Advantages provided by the invention are the breaking up agglomerated solids in the vessel, fluidizing the bed of settled solids, creating a much larger zone of influence from a single fluidizing nozzle without the need for an array of fluidizing nozzles as typically used in larger tanks and vessels, being able to selectively remove layers of solids from the vessel 28 as required and being able to transport much heavier material than in conventional fluidizing arrangements, for example, particulate matter larger than 100 mm through large pipelines.

The invention claimed is:

1. A fluidizing apparatus comprising a vessel having:
   a base,
   an inlet,
   a plurality of outlets positioned at different heights from one another from the base,
   a plurality of respective removable inserts provided in the outlets,
   a fluidizing nozzle disposed in the vessel above the base of the vessel in a manner to create a swirling flow within the vessel, and
   a common outlet line to which the outlets are selectively connectable.

2. The fluidizing apparatus as claimed in claim 1 in which a respective valve is provided for selectively connecting each outlet to the common outlet line.

3. The fluidizing apparatus as claimed in claim 1 in which an internal end of each insert is either substantially flush with an internal wall of the vessel or offset externally of the internal wall.

4. The fluidizing apparatus as claimed in claim 1 in which each insert is-made from a material selected from ceramic, metal, metal alloy, plastic or composite material.

5. The fluidizing apparatus as claimed in claim 1 in which the nozzle is adapted to create swirling flow of a fluid passing through the nozzle.

6. The fluidizing apparatus as claimed in claim 5, in which the fluidizing nozzle comprises a flow chamber provided with means for creating a swirling flow in pressurized fluid flowing through the flow chamber, the flow chamber having a fluid outlet for discharging the swirling flow into the vessel.

7. The fluidizing apparatus as claimed in claim 1 in which the nozzle is a jetting nozzle and a deflector is mounted in front of the nozzle, the deflector being adapted to direct the flow path of a fluid passing through the nozzle.

8. The fluidizing apparatus as claimed in claim 7 in which one or more ultrasonic transducers are incorporated in the deflector.

9. The fluidizing apparatus as claimed in claim 1 in which the inlet is in communication with a hopper for containing media to be fed to the vessel.

10. The fluidizing apparatus as claimed in claim 9 in which a pressure relief line including a pressure relief valve extends from the vessel to the hopper.

11. The fluidizing apparatus as claimed in claim 1 in which the vessel has a vertical axis, the inlet is positioned at an upper end of the vessel, the plurality of outlets are longitudinally spaced vertically along the vessel, and the nozzle is positioned proximate the base of the vessel.

12. A method of fluidizing and partially separating media from a settled bed of solids, the method comprising:
   providing a fluidizing apparatus comprising a vessel in which the settled body of solids is situated, the vessel having a base, an inlet, a plurality of outlets positioned at different heights from one another from the base, a plurality of respective removable inserts provided in the outlets, a fluidizing nozzle disposed within the vessel above the base of the vessel, and a common outlet line to which the outlets are selectively connectable;
   injecting a pressurized fluid into the vessel through the nozzle to create a swirling flow within the vessel which causes the settled solids within the vessel to be fluidized; and
   selectively allowing flow from the vessel through at least one of the outlets.

13. The method as claimed in claim 12 in which the outlets are sequentially selected beginning with the uppermost outlet and ending with the lowermost outlet.

* * * * *